UNITED STATES PATENT OFFICE.

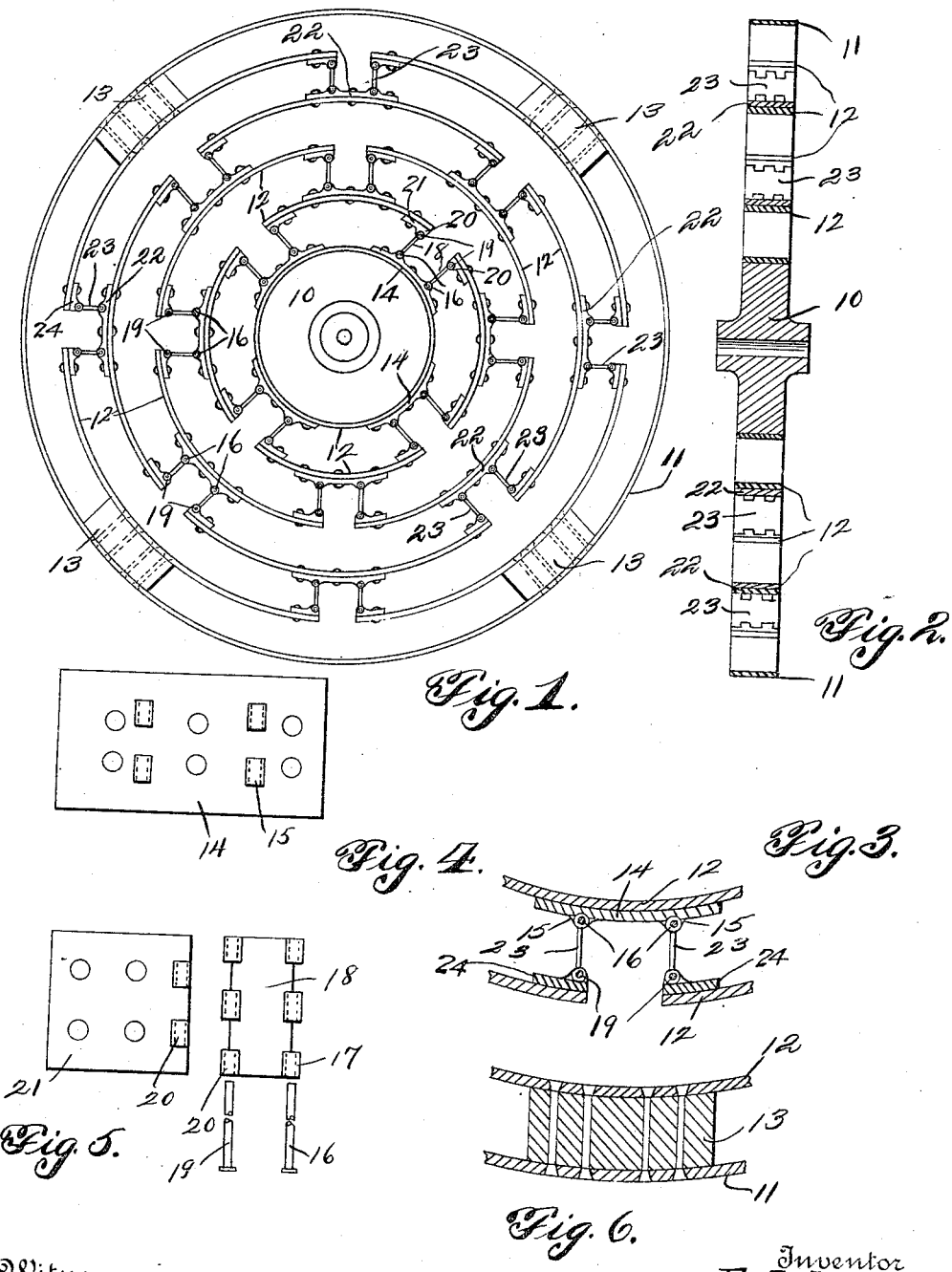

EDWARD A. JESS, OF ANNAPOLIS, MARYLAND.

AUTOMOBILE-WHEEL.

1,297,355.

Specification of Letters Patent.

Patented Mar. 18, 1919.

Application filed August 23, 1918. Serial No. 251,148.

*To all whom it may concern:*

Be it known that I, EDWARD A. JESS, a citizen of the United States, residing at Annapolis, in the county of Anne Arundel, State of Maryland, have invented certain new and useful Improvements in Automobile-Wheels; and I do hereby declare the following to be a full, clear, and exact description of the invention, such as will enable others skilled in the art to which it appertains to make and use the same.

The invention relates to vehicle wheels and more particularly to the class of spring wheels for automobiles, bicycles, perambulators or any other mobile structures.

The primary object of the invention is, the provision of a wheel of this character, wherein a plurality of springs are arranged concentrically with respect to each other about the hub and are flexibly connected together, and, also to the hub and the felly of the wheel, so as to give the required elasticity or resiliency to the wheel for absorbing shocks and jars, incident to the travel thereof, and thereby increasing the life of the wheel and the vehicle on which the same is used.

Another object of the invention is, the provision of a wheel of this character, wherein the construction thereof is novel in form to render the wheel resilient and to assure strength and durability thereto.

A further object of the invention is the provision of a wheel of this character, which is simple in construction, thoroughly reliable and efficient in its purpose and inexpensive to manufacture.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1, is a side elevation of the wheel constructed in accordance with the invention.

Fig. 2 is a central vertical section through the structure shown in Fig. 1.

Fig. 3, is a fragmentary sectional view showing in detail the connection of the springs.

Fig. 4, is a plan view of one of the base plates for the hinge connection between the springs.

Fig. 5 is a view showing one of the hinge plates, a link and its pintles, disassembled, the pintles being partly broken away.

Fig. 6, is a fragmentary sectional view showing in detail the connection of the outer spring sections with the rim of the wheel.

Similar reference characters indicate corresponding parts throughout the several views in the drawing.

Referring to the drawing in detail, the wheel comprises a hub body 10 adapted to fit an axle in any ordinary well known manner and 11 the annular rim which is disposed concentrically of the hub 10 and is adapted to support a tire, yet the same may be constructed to form the tread of the wheel.

Arranged between the hub 10 and the rim 11, are series of spaced leaf spring sections 12 which are arcuately bowed and disposed concentrically of and about the hub 10 and the sections 12 of each of the series are arranged in staggered relation to the sections 12 of the next series with the ends of the sections of each series in overlapped relation to those of the next series.

Bolted or otherwise secured at intervals to the inner periphery of the rim 11 are blocks 13, which are bolted or otherwise fastened to the sections 12 of the outermost series of leaf springs at intermediate points of said sections, while fixed to the outer periphery of the hub 10 at intervals thereof are base plates 14 which have outwardly directed pintle-receiving eyes 15 arranged in spaced pairs and in which are engaged pivot pintles 16, the same being also engaged in pintle eyes 17 formed on links 18, thereby swingingly connecting the latter to the base plates 14. These links are swingingly connected through the medium of pivot pintles 19 and pintle eyes 20 with hinge plates 21, fastened to the ends of the innermost series of spring sections 12. The pintle eyes 20 are formed on the members 18 and the plates 21, as will be apparent.

Mounted medially on the sections 12 of the springs of the series intermediate the innermost and outermost series are the bed or base plates 22, constructed like the plates 14 and having hinged thereto the links 23 or connecting members similar to the links or members 18, and these links or members 23 are hinged to the hinge plates 24 similar to the plates 21 and which are fixed to the adjacent ends of the sections 12 of the next series, so that the wheel in its entirety is of a unitary structure possessing resiliency to absorb shocks and jars imparted thereto, and thus acting as a shock absorber.

It is of course to be understood that the invention is not restricted to the embodiment thereof as hereinbefore described and illustrated in the accompanying drawing, because changes, variations and modifications are contemplated and shall be resorted to such as come properly within the scope of the appended claims.

What is claimed is:

1. A vehicle wheel comprising a hub and a rim, a plurality of spaced annular series of spaced resilient members between the hub and rim spaced from the hub and rim and concentric therewith, flexible connections between the hub and the adjacent series, flexible connections between the members of successive series of resilient members and connections between the outermost series of resilient members and the rim.

2. A vehicle wheel comprising a hub and a rim, concentric series of resilient spaced members spaced from the hub and rim, flexible connections between the hub and the ends of the members of the series next to the hub, connections between the middle portion of the resilient members of each series and the end portions of the next surrounding series and connections between the outermost series and the rim.

3. A vehicle wheel comprising a hub and a rim, an annular series of spaced arcuate spring plates between the hub and rim, links pivotally connecting the ends of each plate with the hub and connections between the central portion of each plate and the rim.

4. A vehicle wheel comprising a hub and a rim, an annular series of spaced arcuate spring plates between the hub and rim, links pivotally connecting the ends of each plate with the hub and means connecting the middle portion of each plate with the rim, said means being yieldable radially and circumferentially of the wheel.

In testimony whereof, I affix my signature, in the presence of two witnesses.

EDWARD A. JESS.

Witnesses:
CHARLES E. CHANCE,
WILLIAM S. COOPER.

Copies of this patent may be obtained for five cents each, by addressing the "Commissioner of Patents, Washington, D. C."